(12) United States Patent
Russell et al.

(10) Patent No.: US 7,748,353 B2
(45) Date of Patent: Jul. 6, 2010

(54) HYDRAULIC ACTUATION SYSTEM FOR IMPROVED ENGINE CONTROL

(75) Inventors: John D. Russell, Portland, OR (US); Michael Andri, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 11/367,504

(22) Filed: Mar. 2, 2006

(65) Prior Publication Data

US 2007/0204817 A1 Sep. 6, 2007

(51) Int. Cl.
*F01L 9/02* (2006.01)

(52) U.S. Cl. ............... 123/90.12; 123/90.16; 123/90.15; 123/90.17

(58) Field of Classification Search ............... 123/90.12, 123/90.15, 90.16, 90.17, 90.31
See application file for complete search history.

(56) References Cited

U.S. PATENT DOCUMENTS

| | | | |
|---|---|---|---|
| 5,924,395 A * | 7/1999 | Moriya et al. ............ 123/90.15 |
| 6,170,448 B1 * | 1/2001 | Asakura ................... 123/90.18 |
| 6,269,788 B1 | 8/2001 | Kachelek |
| 6,647,326 B2 | 11/2003 | Nakamori et al. |
| 6,709,362 B2 | 3/2004 | Tomohiro et al. |
| 6,758,293 B2 | 7/2004 | Kayukawa et al. |
| 6,769,502 B2 | 8/2004 | Nakamori et al. |
| 6,799,109 B2 | 9/2004 | Nakamori et al. |
| 6,817,964 B2 | 11/2004 | Kayukawa et al. |
| 6,871,620 B2 | 3/2005 | Aimone |
| 6,886,524 B2 | 5/2005 | Hanada et al. |
| 6,913,558 B2 | 7/2005 | Mori et al. |
| 6,952,057 B2 | 10/2005 | Tajima et al. |
| 6,964,631 B2 * | 11/2005 | Moses et al. ................... 477/3 |
| 7,546,821 B2 | 6/2009 | Russell et al. |
| 2002/0177939 A1 * | 11/2002 | Kabasin ..................... 701/110 |
| 2005/0211207 A1 * | 9/2005 | Urushihata et al. ....... 123/90.17 |

\* cited by examiner

*Primary Examiner*—Zelalem Eshete
(74) *Attorney, Agent, or Firm*—Julia Voutyras; Alleman Hall McCoy Russell & Tuttle LLP

(57) ABSTRACT

A system for an internal combustion engine of a vehicle is provided. The system comprises a hydraulic pump configured to be powered at least partially by a source other than the engine; an adjustable hydraulic engine actuator configured to be adjusted by hydraulic fluid of the pump; a control system configured to adjust said adjustable hydraulic actuator.

27 Claims, 8 Drawing Sheets

HYDRAULIC ACTUATION SYSTEM FOR IMPROVED ENGINE CONTROL

CROSS-REFERENCE TO RELATED APPLICATIONS

This application is related to U.S. application No. 11/367503, filed Mar. 2, 2006 by John D. Russell and Michael Andri, and titled HYDRAULIC ACTUATION SYSTEM FOR IMPROVED ENGINE START. The entirety of the above listed application is incorporated herein by reference for all purposes.

BACKGROUND AND SUMMARY

Some engines utilize one or more valves that may be adjusted in response to an operating condition of the vehicle. In one example, an engine may have variable valve timing and/or lift that enables adjustment of valve operation depending on operating conditions. Specifically, engines may use variable cam timing powered by a hydraulic actuator to vary intake and/or exhaust valve timing relative to crank angle to improve engine performance over a broad range of conditions. However, hydraulic pressure may not be available during some conditions, such as at low engine speed and/or high engine temperature. When there is insufficient hydraulic pressure to adjust valve operation these devices may have a spring-biased default position.

The inventors herein have recognized disadvantages with these approaches. In some examples, the spring-biased default position results in the valves being positioned in the default setting, regardless of widely varying starting and/or stopping conditions, resulting in degraded engine operation. While one approach may be to increase the size of the hydraulic pump, this may increase parasitic loss and increase weight of the engine, thereby reducing efficiency.

In another approach, the above issues may be addressed by a system for an internal combustion engine of a vehicle, comprising a hydraulic pump configured to be powered at least partially by a source other than the engine; an adjustable hydraulic engine actuator configured to be adjusted by hydraulic fluid of the pump; a control system configured to adjust said adjustable hydraulic actuator.

In this way, when engine conditions would provide insufficient hydraulic pressure, hydraulic actuation can still be achieved. Thus, the range of engine control may be expanded resulting in improved engine performance and increased efficiency.

DETAILED DESCRIPTION

Figure 1:
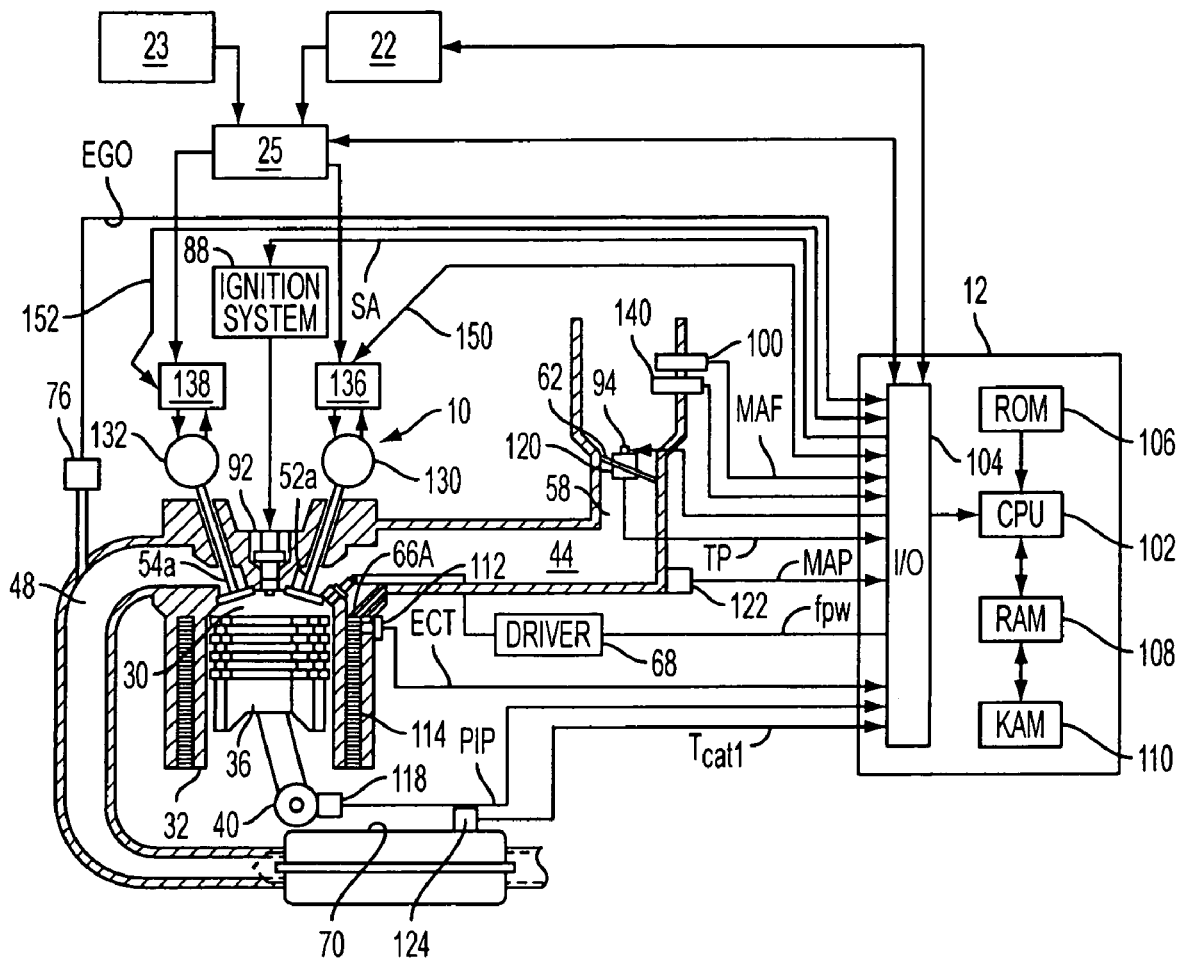
FIG. 1 is a schematic diagram of a cylinder of an example internal combustion engine.

FIG. 1 shows one cylinder of a multi-cylinder engine, as well as the intake and exhaust path connected to that cylinder. Internal combustion engine 10, comprising a plurality of combustion chambers, is controlled by a control system, which may include one or more controllers such as electronic engine controller 12. Combustion chamber 30 of engine 10 is shown including combustion chamber walls 32 with piston 36 positioned therein and connected to crankshaft 40.

Combustion chamber (i.e. cylinder) 30 is shown communicating with intake manifold 44 and exhaust manifold 48 via respective intake valves 52*a* and 52*b* (not shown), and exhaust valves 54*a* and 54*b* (not shown). While in this example two intake and two exhaust valves are used, alternative valve configurations may also be used, such as, for example, one intake and one exhaust valve, or two intake and one exhaust valves, etc.

Fuel injector 66A is shown directly coupled to combustion chamber 30 for delivering injected fuel directly therein in proportion to the pulse width of signal fpw received from controller 12 via electronic driver 68. In an alternative embodiment, a port fuel injection configuration may be used where a fuel injector is coupled to intake manifold 44 in a port, rather than directly to cylinder 30. Further, the fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. The example exhaust emission control device 70 represents one or more catalytic devices, such as three way catalyst, NOx traps, etc. that may be used. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assistance. Further, in an alternative embodiment, the combustion chamber has no spark plug.

As shown in FIG. 1, engine 10 may have an intake camshaft 130 and an exhaust camshaft 132, where camshaft 130 actuates both intake valves 52*a,b* and camshaft 132 actuates both exhaust valves 54*a,b*. However, engine 10 may alternatively have a single camshaft that actuates both intake valves 52*a,b* and exhaust valves 54*a,b*. In some examples, camshaft (overhead and/or pushrod) arrangements could be used, if desired.

Actuators 136 and 138 are shown controlling operation of the intake and exhaust valves via cam shafts 130 and 132 respectively. Thus, actuators 136 and 138 may be controlled to independently vary operation of the intake and exhaust valves. However, in one example, engine 10 may include only one actuator per cylinder or cylinder group configured to adjust only one or more sets of intake valves. Alternatively, engine 10 may include only one actuator per cylinder or cylinder group configured to adjust only one or more sets of exhaust valves. In yet another example, engine 10 may include only one actuator per cylinder or cylinder group configured to adjust two or more sets of intake and/or exhaust valves.

Actuators 136 and 138 may be hydraulically actuated and may be controlled by hydraulic fluid such as engine oil supplied from at least one of oil pump 22 and oil pump 23 via hydraulic control valve set 25, which may include one or more spool valves for each hydraulic valve or cam actuator. For example, hydraulic actuators 136 and 138 may include vane type actuators in which hydraulic engine oil pressured by one or more oil pump(s) is used to advance/retard the intake and/or exhaust cam/valve timing. In some examples, a locking pin and spring mechanism may be utilized to place actuators 136 and 138 in default locked positions if insufficient oil pressure/flow (i.e. hydraulic pressure) is present to control timing position. The locked position may be either fully advanced, or fully retarded, for example.

In the above example which illustrates hydraulic actuation to adjust valve operation, there are various types of hydraulic actuators that may be used For example, in some embodiments, valve timing may be adjusted by a variable valve timing (VVT) or variable cam timing (VCT) system, which can be configured to adjust the valve and/or cam timing relative to crankshaft 40. Further, the valves can be actuated, in some embodiments, via lift profiles on the camshafts, where the lift profiles between the different valves may vary in height, duration, and/or timing via hydraulic actuator.

In still another embodiment, valve timing and/or valve lift may be adjusted by a cam profile switching (CPS) system that is configured to switch between two or more cam profiles for controlling one or more of the intake and/or exhaust valves via hydraulic actuation. In yet another embodiment, valve lift may be adjusted by a hydraulic variable valve lift (VVL) system configured to adjust lift of one or more of the intake and/or exhaust valves.

Another hydraulic valve actuation system that may be used includes a cylinder deactivation mechanism, in which one or more of the intake and/or exhaust valves are deactivated to be held in an open or closed position for one or more combustion cycles of the engine. In some embodiments, one or more of the systems described above may be configured to provide valve deactivation operation. Such operation may be used for example during cylinder deactivation and/or engine deactivation, or engine shutdown.

The valve adjustment operations described above may require sufficient hydraulic pressure to move one of actuators 136 and 138 from a first position to a second position and/or to engage or disengage a locking pin, for example. As such, engine 10 may include one or more hydraulic pumps shown herein as first oil pump 22 and second oil pump 23 that are configured to supply oil pressure to engine 10. First oil pump 22 can be configured to be at least partially driven or powered by a source other than engine 10. For example, first oil pump 22 can be at least partially driven by an electric motor, thereby providing oil pressure to engine 10 at least partially independent of engine speed. In some embodiments, engine 10 may also include a second oil pump 23 that is driven or powered at least partially by engine 10. For example, second oil pump 23 can be driven by crankshaft 40, thereby providing oil pressure to engine 10 in relation to engine output. In yet another example, first oil pump 22 may be partially driven by engine 10 and by a secondary power source such as an electric motor. This configuration may further utilize an electric boost feature that enables first oil pump 22 to be driven by torque supplied by the engine for most of the engine operation, but would allow additional pumping when additional hydraulic pressure is needed (e.g. during hydraulic actuation at low engine speeds). In some embodiments, engine 10 may be without an engine driven oil pump such as second oil pump 23 or any other engine driven oil pump.

While electric valve actuators (EVA) may alternatively be used to adjust various valve conditions, the hydraulic actuator system described herein may be advantageous in providing a lower system cost, less maintenance, or increased reliability.

Continuing with FIG. 1, in some embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling intake/exhaust valve timing. Engine 10 may operate in various modes, including lean operation, rich operation, and "near stoichiometric" operation. "Near stoichiometric" operation refers to oscillatory operation around the stoichiometric air fuel ratio.

A control system including at least controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 115; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft. In this particular example, temperature Tcat1 of device 70 may be inferred from engine operation. In an alternate embodiment, temperature Tcat1 is provided by temperature sensor 110. Furthermore, controller 12 can be configured to determine the position of hydraulic actuators 136 and 138 or the relative cam timing, thereby determining the position, timing, and/or operation of the intake and/or exhaust valves, or vice versa. Controller 12 can also be configured to control operation of other vehicle systems, as will be described below with reference to FIG. 2.

It should be appreciated that FIG. 1 merely shows one cylinder of a multi-cylinder engine, and that each cylinder has its own set of intake/exhaust valves, fuel injectors, spark plugs, etc.

Figure 2:
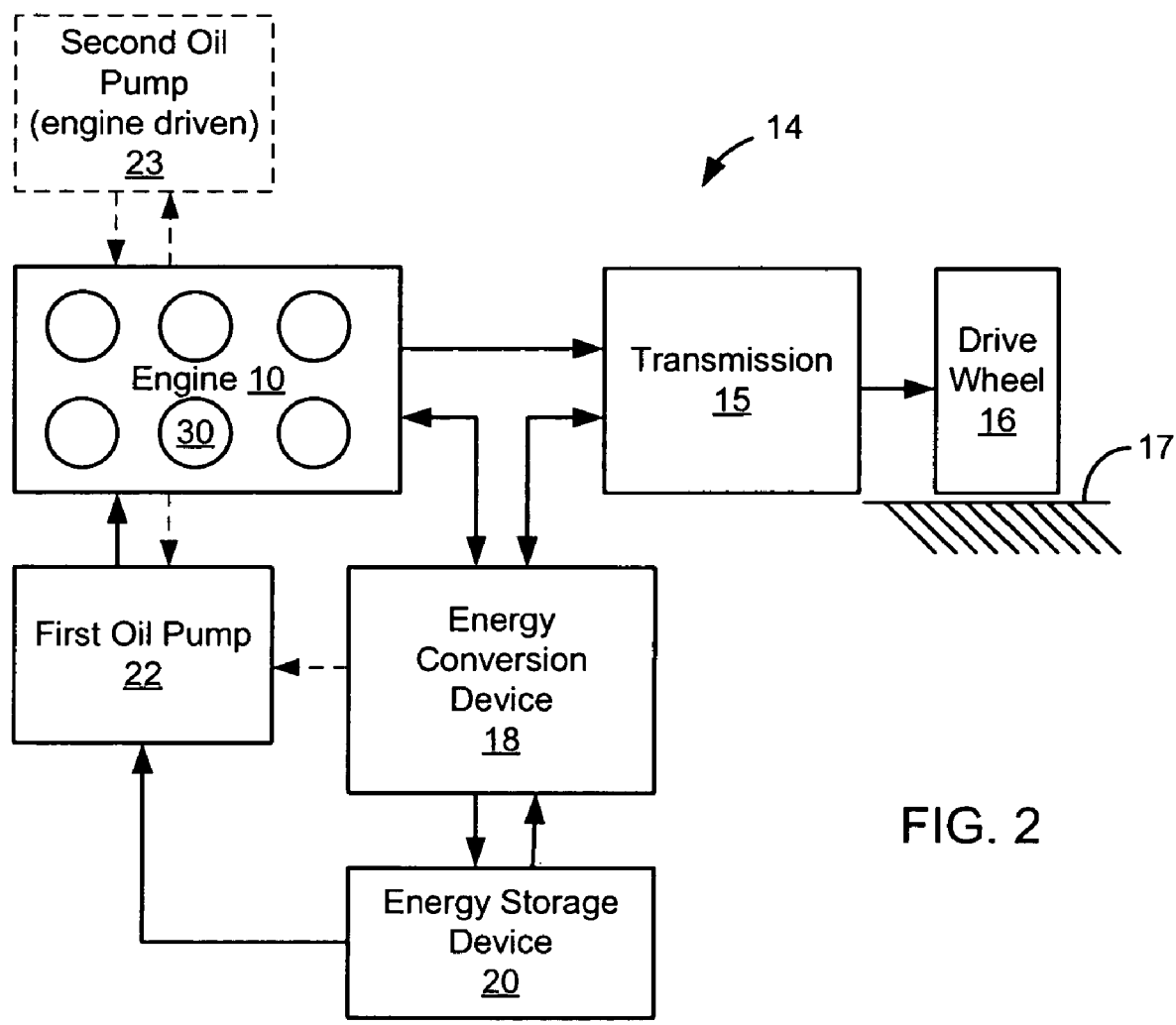
FIG. 2 is a schematic diagram of a hybrid propulsion system.

Referring now to FIG. 2, engine 10 is shown configured in an example hybrid propulsion system 14. Although operation of engine 10 is described in FIG. 2 with respect to a hybrid propulsion system, it should be appreciated that the teachings described herein may apply to engines not configured in hybrid propulsion systems and other engine configurations.

In some embodiments, engine 10 may be configured in a hybrid propulsion system 14, as shown in FIG. 2. Engine 10 may be coupled to a transmission 15 such that engine 10 can supply an engine output (e.g. work, torque, power, speed, etc.) to drive wheels 16, which are in contact with road surface 17. Transmission 15 may be a manual transmission, automatic transmission, or combinations thereof. Further, various additional components (not shown) may be included, such as a torque converter, and/or other gears such as a final drive unit, etc.

In this example embodiment, hybrid propulsion system 14 may also include an energy conversion device 18 and an energy storage device 20. The energy conversion device may include a motor and/or a generator, among other components, for converting energy between energy storage device 20 and engine 10 and/or transmission 15, among other vehicle systems. Energy storage device 20 may include one or more components configured to store energy such as a battery, a capacitor, a flywheel, a pressure vessel, etc.

It should be appreciated that hybrid propulsion system 14 may be configured to utilize a variety of energy storage and conversion methods. As one example, hybrid propulsion system 14, may be configured as a hybrid electric vehicle (HEV) that utilizes a battery as an energy storage device and an electric motor/generator as an energy conversion device. In another example, a hydraulic system may be used where a pressure vessel is used as an energy storage device and a hydraulic motor/generator as an energy conversion device.

Continuing with FIG. 2, energy conversion device 18 can be configured to absorb energy from motion of the vehicle (e.g. through regenerative braking) and/or at least a portion of the output produced by the engine, and convert the absorbed energy to an energy form suitable for storage by the energy storage device, thereby providing a generator operation. In some embodiments, the energy conversion device can also be configured to supply an output (e.g. power, work, torque, speed, etc.) to drive wheels 16 and/or engine 10, thereby providing a motor operation. It should be appreciated that the energy conversion device may, in some embodiments, be configured to provide only a motor operation, only a generator operation, or both motor and generator operations, among others. In some embodiments, a starter motor may be coupled to crankshaft 40 via a flywheel; however energy conversion device 18 may alternatively be used to facilitate engine starting.

Hybrid propulsion system 14 may also include one or more hydraulic pumps, which may be controlled by controller 12. As shown in FIG. 2, a hydraulic pump such as first oil pump 22 can be configured to be at least partially driven by a source other than engine 10. These sources may include the energy conversion device, the energy storage device, the transmission, and/or the drive wheels, among others. In one example, first oil pump 22 may be an electric oil pump configured to receive electrical energy from a battery, thereby providing oil pressure to engine 10 independent of engine speed. In another example, first oil pump 22 may receive mechanical energy from energy conversion device 18 (shown in FIG. 2 as a broken line). Thus, energy conversion device 18 may include an electric motor that is configured to mechanically drive first oil pump 22 so that oil pressure is provided to engine 10 independent of engine speed. In yet another example, mechanical energy may be supplied directly to first oil pump 22 by transmission 15 or drive wheel 16.

In some embodiments, a second engine driven oil pump 23 (shown in FIG. 2 by a broken line) may be used to provide oil pressure to engine 10. Thus, the oil pressure provided to engine 10 by second oil pump 23 may at least partially depend on the speed and/or engine output produced by engine 10. In this manner, second oil pump 23 may provide at least a portion of the oil pressure supplied to engine 10, while first oil pump 22 may be operated to supply additional oil pressure to engine 10 via a source other than the engine. Alternatively, first oil pump 22 may be configured to be driven at least partially by engine 10 and at least one other source. For example, first oil pump 22 may be partially driven by engine 10 (shown by a broken line), thereby providing oil pressure which is at least partially dependent on the speed of engine 10, while providing additional oil pressure in response to energy received from at least one of energy conversion device 18, energy storage device 20, transmission 15, and drive wheels 16, among others.

In another example, second oil pump 23 that is engine driven may be configured to supply oil pressure for lubrication of various components of engine 10 while first oil pump 22 that is driven at least partially by a source other than engine 10 is used to supply oil pressure to hydraulic actuators 136 and 138. In this way, valve adjustments may be performed even when engine speed is low and/or the engine is shut-off.

First oil pump 22 may be controlled by controller 12 to vary hydraulic pressure supplied to the engine in response to at least one of a valve adjustment request, ambient air temperature, engine temperature, ambient air pressure, engine speed, combustion mode, number of deactivated combustion chambers or other operating mode or condition of the engine.

The depicted connections between engine 10, energy conversion device 18, transmission 15, second oil pump 23, and drive wheel 16 may indicate transmission of mechanical energy from one component to another, whereas the connections between the energy conversion device, the energy storage device, and first oil pump 22 may indicate transmission of a variety of energy forms such as electrical, mechanical, etc. For example, torque may be transmitted from engine 10 to drive wheels 16 via the transmission, while electrical energy may be supplied to first oil pump 22 via the energy storage device.

As described above energy conversion device 18 may be configured to operate in a generator mode and/or a motor mode. In a generator mode, energy conversion device 18 may absorb some or all of the output from engine 10 and/or transmission 15, which reduces the amount of drive output delivered to the drive wheel 16, or the amount of braking torque to the drive wheel 16. Such operation may be employed, for example, to achieve efficiency gains through regenerative braking, improved engine efficiency, etc. Further, energy conversion device 18 may also be used to supply energy to energy storage device 20 for later use. In motor mode, the energy conversion device may supply mechanical output to engine 10 and/or transmission 15, for example by using electrical energy stored in an electric battery.

Some embodiments of the hybrid propulsion system 14 may include full hybrid systems, in which the vehicle can be propelled by only the engine, only the energy conversion device (e.g. motor), or a combination thereof. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

The various components of the hybrid propulsion system 14 including engine 10, transmission 15, energy conversion device 18, energy storage device 20, first oil pump 22, and second oil pump 23 may also be controlled by controller 12 as described above with reference to FIG. 1, or via another control system.

As described above, engine 10 can be configured to operate in different operating modes depending on operating conditions of the engine and/or vehicle. For example, one or more cylinders of engine 10 may be configured to operate in a plurality of combustion modes, which may include spark ignition (SI), homogeneous charge compression ignition (HCCI), compression ignition (CI), and spark assisted HCCI, among others. Thus, transitions between two or more of these combustion modes may be performed by adjusting a condition of one or more intake and/or exhaust valves by hydraulic actuation. In some embodiments, one or more engine cylinders may be deactivated, which may also be performed by adjusting a condition of one or more intake and/or exhaust valves by hydraulic actuation. In some conditions, engine 10 may be shut-off or deactivated (i.e. combustion in all engine cylinders is stopped) while the vehicle may be propelled by operating the energy conversion device to convert stored energy into wheel power. However, it should be appreciated that adjustments of valve condition(s) by hydraulic actuation need not be limited to transitioning between operating modes (i.e. combustion modes, cylinder deactivation, engine shut-off, etc.), but may be utilized at any time during vehicle operation or even when the vehicle is shut-off.

Figure 3:
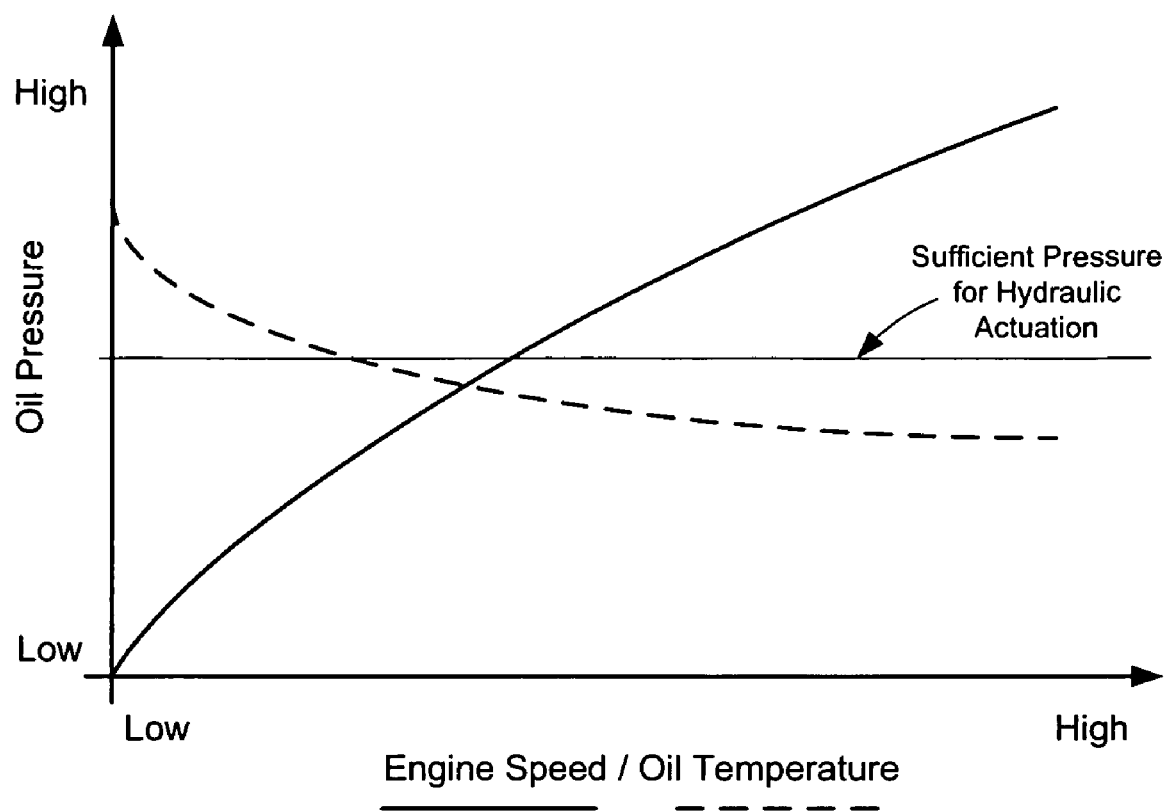
FIG. 3 is a graph showing characteristics of an example engine driven oil pump.

FIG. 3 is a graph showing characteristics of an example engine driven oil pump, such as second oil pump 23. Oil pressure supplied by the engine driven oil pump is shown on the vertical axis, while engine speed and oil temperature are shown along the vertical axis. A solid line is shown that represents a comparison of the oil pressure produced by the example engine driven oil pump for a range of engine speeds. A broken line is also shown that represents a comparison of the oil pressure produced by the example engine driven oil pump for a range of oil temperatures. Further, a horizontal line is shown representing the hydraulic pressure sufficient to provide hydraulic actuation or adjustment of various engine actuators for adjusting engine operation, such as valve timing, valve lift, cam profile selection, etc. Note that these are exemplary lines that may vary depending on system design or other parameters.

As shown in FIG. 3, as the engine speed is increased, the oil pressure supplied by the engine driven oil pump increases. Conversely, as the temperature of the oil increased, the oil pressure supplied by the engine driven oil pump may be decreased. Depending on the configuration of the oil pump, the oil pressure that it provides may be less than the pressure sufficient to perform various adjustments to the engine that rely on hydraulic actuation. For example, at low engine speed, the oil pressure supplied by the engine driven oil pump may be less than sufficient to provide hydraulic actuation. This problem may be exacerbated when the engine is shut-off and the oil pressure is further reduced. Furthermore, the temperature of the oil may also decrease the oil pressure supplied by the oil pump. Thus, the engine driven oil pump may provide insufficient hydraulic pressure for adjustments that utilize hydraulic actuation during some conditions. If instead the oil pump is sized to always provide the sufficient hydraulic pressure, the oil pump may be larger than necessary for much of the vehicle operation, resulting in reduced efficiency and increased production cost.

It should be appreciated that the graph shown in FIG. 3 represents an example engine driven oil pump. Other engine driven oil pumps may exhibit different relationships between oil pressure and engine speed and/or oil temperature. Furthermore, this relationship may also be dependent upon how the pump is sized and/or configured. Thus, the graph of FIG. 3 is provided to illustrate the dependency of oil pressure on engine speed and/or oil temperature for an example engine driven oil pump.

In one embodiment, the hybrid propulsion system may include an oil pump such as first oil pump 22 in addition to an engine driven oil pump 23. The first oil pump 22 may be driven by at least one of the energy storage device and/or the energy conversion device such that the oil pressure provided to the engine may be at least partially independent of the engine speed. By selectively operating first oil pump 22, additional oil pumping may be achieved, enabling the engine to maintain sufficient oil pressure for hydraulic actuation of various control systems even when the engine speed is too low or the oil temperature is too high for the engine driven oil pump to maintain sufficient hydraulic pressure.

In an alternative embodiment, engine driven oil pump 23 may not be included. Therefore, oil pressure may be maintained by adjusting an amount of energy supplied to first oil pump 22 via at least one of the energy storage device and/or energy conversion device. In some examples, first oil pump 22 may be at least partially engine driven, wherein it is also configured to accept energy from either the energy storage device or the energy conversion device to provide additional pumping. Thus, the oil pressure supplied to the engine may be varied by adjusting the energy supplied to first oil pump 22.

FIGS. 4-7 are flow charts showing example control strategies for a hybrid vehicle configured with an oil pump that is configured to provide oil pressure to engine 10 that is at least partially independent of engine speed (i.e. oil pressure may be supplied to the engine by a source other than the engine).

Figure 4:
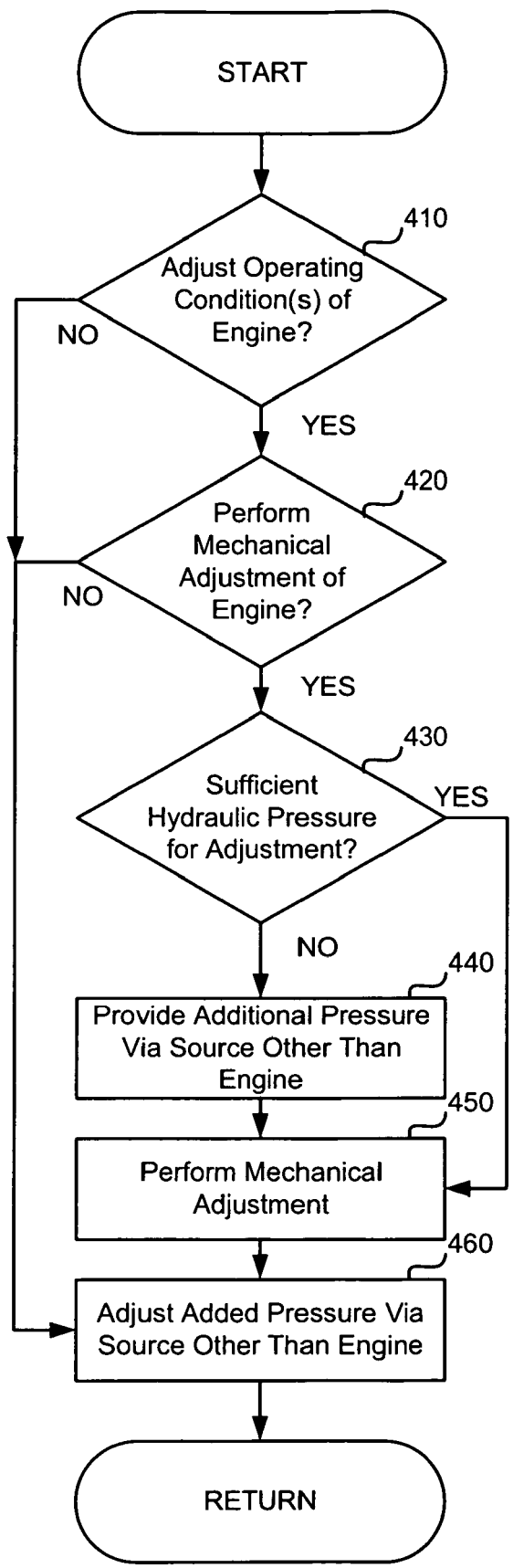
FIGS. 4-7 are flow charts showing example control strategies for a hybrid vehicle.

Specifically, FIG. 4 shows an example control strategy for providing oil pressure during operation of the hybrid vehicle propulsion system. At 410, it is judged whether an operating condition of the engine is to be adjusted. Engine operating conditions may include a condition of an intake or exhaust valve such as valve lift, valve timing, cam selection, cam timing, and valve deactivation, among others and combinations thereof. Engine operating conditions may also include spark timing, EGR contributions, turbocharging/supercharging conditions, throttle conditions, combustion mode, cylinder deactivation or activation, air/fuel ratio, among others and combinations thereof. If the answer is no (i.e. no adjustment of the engine is desired), the pressure supplied to the engine via a source other than the engine is adjusted to maintain the desired oil pressure (460). For example, electrical energy supplied to an electric oil pump from a battery can be adjusted to maintain a desired oil pressure. Additionally, if some of the pressure provided by one or more oil pumps is engine driven, then the pumping provided via first oil pump 22 may be reduced or stopped. If no pressure/pumping is engine driven, then first oil pump 22 may continue operating via stored energy to provide oil pressure to the engine.

Continuing with FIG. 4, if the answer at 410 is yes, it is next judged at 420 whether the engine adjustment is a mechanical adjustment that is hydraulically actuated. For example, one or more valve conditions may be adjusted by hydraulic actuations, via variable valve timing (VVT), variable valve lift (VVL), cam profile switching (CPS), variable cam timing (VCT), and valve deactivation. As one example, a cam profile switching (CPS) system may be hydraulically actuated by oil pressure supplied by at least one of first oil pump 22 and second engine oil pump 23 to adjust a cam profile used to drive one or more valves. If the answer at 420 is no, the routine may proceed to 460 as described above. Alternatively, if the answer at 420 is yes, the routine proceeds to 430.

At 430 it is judged whether there is sufficient oil pressure for performing the desired adjustment. As described above with reference to FIG. 3, oil pressure may be insufficient under some conditions to perform the desired adjustment. For example, if oil pressure is provided by an engine driven oil pump 23, and the speed of the engine is too low, then the oil pressure may be insufficient to perform the desired adjustment. In another example, an engine driven oil pump 23 may be sized to provide sufficient oil pressure for engine lubrication, but not for performing valve adjustments via hydraulic actuation. Thus, first oil pump 22 may be variably, intermittently, and/or selectively operated by a source other than the engine to increase the oil pressure so that the desired hydraulic actuation is achieved.

First oil pump 22 powered by a source other than the engine (under some conditions) may also be used to reduce the effects of oil temperature on the oil pressure provided to the engine. For example, the energy provided to first oil pump 22 by at least one of the energy storage device and the energy conversion device may be increased with increasing oil temperature to maintain the desired oil pressure. In yet another example, if first oil pump 22 is configured to be at least partially driven by the engine, additional energy may be supplied to first oil pump 22 to provide additional pressure via a source other than engine 10. Therefore, if the answer at 430 is no, first oil pump 22 is operated to provide sufficient hydraulic pressure for the desired adjustment.

Alternatively, if the answer at 430 is yes, then the routine proceeds to 440, where the mechanical adjustment is performed by supplying sufficient hydraulic pressure to the desired component. In some examples, the oil pressure supplied to each hydraulically actuated component or system may be controlled by a spool valve or other valve, which in turn may be controlled by controller 12. However, other configurations for adjusting the oil pressure supplied to hydraulic actuators are possible.

Next, the routine can proceed to 460 where the pressure provided by a source other than the engine (e.g. first oil pump 22) is adjusted to maintain the desired oil pressure. For example, if the engine is configured with an engine driven oil pump 23, then the pressure supplied by first oil pump 22 may be reduced by reducing the energy supplied from at least one of the energy storage device and the energy conversion device. However, in some examples, first oil pump 22 may be shut-off if sufficient oil pressure is maintained by engine driven oil pump 23. Next, the routine returns to 410.

Figure 5:
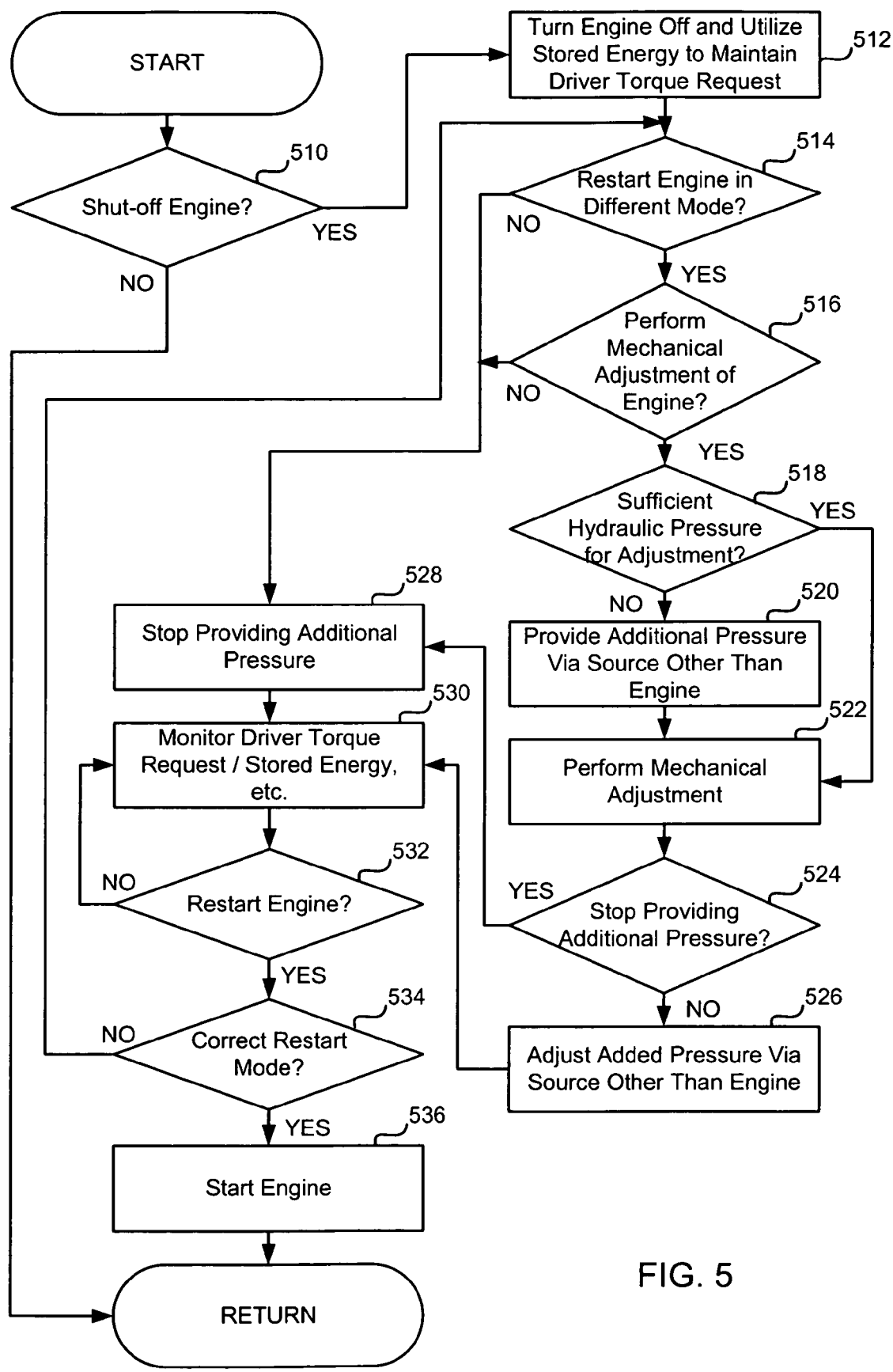

FIG. 5 provides an example control strategy for performing hydraulic actuation of various components during engine shut-off operation. At 510 it is judged whether to shut-off the engine. During operation of the hybrid propulsion system, the engine may be shut-off in response to various operating conditions of the vehicle. For example, the engine may be shut-off when the energy conversion device (e.g. motor) can provide sufficient output to propel the vehicle, thereby conserving fuel. In another example, the engine may be shut-off when a recharging operation of the energy storage device is complete. In yet another example, the engine may be shut-off to perform a transition between operating modes of the engine. It should be appreciated that there are many other scenarios where operation of the hybrid propulsion system may continue even when the engine is shut-off.

Continuing with 510 of FIG. 5, if it is judged no, the routine returns to 510. Alternatively, if the answer is yes, the engine is turned off and the energy conversion device is operated to maintain the driver requested propulsion (512). In some conditions, some adjustments to the operating conditions/parameters of the vehicle may be performed prior to engine shut-off. Next, it is judged at 514 whether to restart the engine in a different mode. For example, the engine may be operating in HCCI mode prior to being shut-off and restarted in SI mode. In another example, the engine may be operating with a first number of deactivated cylinders prior to being shut-off and restarted with a different number of deactivated cylinders.

In yet another example, the engine may be operating with a first valve timing prior to being shut-off and restarted with a different valve timing. For example, the engine may be shut down with a valve timing more advanced than that used to start the engine, or vice versa. Such operation may be advantageous in that it is possible to operate with valve operation that reduces unburned air passing through the emission control device (e.g., during cranking) that can saturate the device with oxygen. In other words, the valve operation can be different during cranking than during the first combustion event, or different during cranking than during shutdown. Further still, different cylinder valve operation (e.g., timing, lift, deactivation) may be used for different starting conditions so that improved combustion can be obtained over a variety of starting conditions, such as for variable temperature ranges, barometric pressure ranges, etc. Continuing with FIG. 5, if the answer at 514 is no, the routine proceeds to 528.

Alternatively, if the answer at 514 is yes, it is judged at 516 whether a mechanical adjustment is to be performed via hydraulic actuation. If the answer is no, the routine proceeds to 528. Alternatively, if the answer at 516 is yes, it is judged at 518 whether there is sufficient oil pressure to provide the desired adjustment via hydraulic actuation. If the answer at 518 is yes, the mechanical adjustment is performed. If the answer at 518 is no, first oil pump 22 is operated to provide sufficient oil pressure to achieve the desired hydraulic actuation. Next, the routine proceeds to 522, where the adjustment is performed.

After the adjustment(s) has been performed, first oil pump 22 may be shut-off since the engine is likewise shut-off. For example, if the engine is still rotating, first oil pump 22 may continue to provide additional pressure. Alternatively, if the engine is stopped (i.e. not rotating) it may be desirable to shut-off first oil pump 22 to further conserve stored energy. If the answer at 524 is no, first oil pump 22 is adjusted to maintain the desired oil pressure, where the routine proceeds next to 530. Alternatively, if the answer at 524 is yes, first oil pump 22 is shut-off at 528. Next, at 530, the operating conditions of the hybrid propulsion system are monitored including, for example, the driver requested torque and amount of energy stored by the energy storage device, among other conditions. At 532 it is judged whether to restart the engine. The determination made at 532 may be at least partially based on the monitored operating conditions of the propulsion system. For example, if the amount of energy stored (e.g. state of charge) by the energy storage device (e.g. battery) is low, the engine may be restarted to supply energy (i.e. recharge) to the energy storage device.

If the answer at 532 is no, the routine returns to 530 where the operating conditions of the hybrid propulsion system continue being monitored. Alternatively, if the answer at 532 is yes, the routine proceeds to 534. At 534 it is judged whether the engine is in the correct restart mode. For example, the engine may have been operating in HCCI mode prior to being shut-off, wherein a subsequent adjustment of the engine during shut-off was performed to prepare for restart of the engine in SI mode. However, if an operating condition of the vehicle has changed after the adjustment in preparation for SI mode, then an additional adjustment(s) may be performed. For example, if the engine was adjusted for SI mode, but it is instead to be restarted in HCCI mode, then additional adjustments of the engine may be performed.

Therefore, if the answer at 534 is no, the routine returns to 514, where additional adjustments may be performed. Alternatively, if the answer at 534 is yes, the engine may be restarted (536). Next, the routine may return to 510. In some examples, first oil pump 22 may be operated to provide additional oil pressure before and/or during engine crank and start-up, thereby improving lubrication of the engine during the initial engine cycles. Furthermore, it may be possible to reduce the size of the engine driven oil pump or completely eliminate it, since pumping may be provided by stored energy supplied to first oil pump 22. Thus, the elimination or reduction of the engine driven oil pump may decrease the amount of energy required to start the engine, thereby enabling a further increase in vehicle efficiency.

Figure 6:
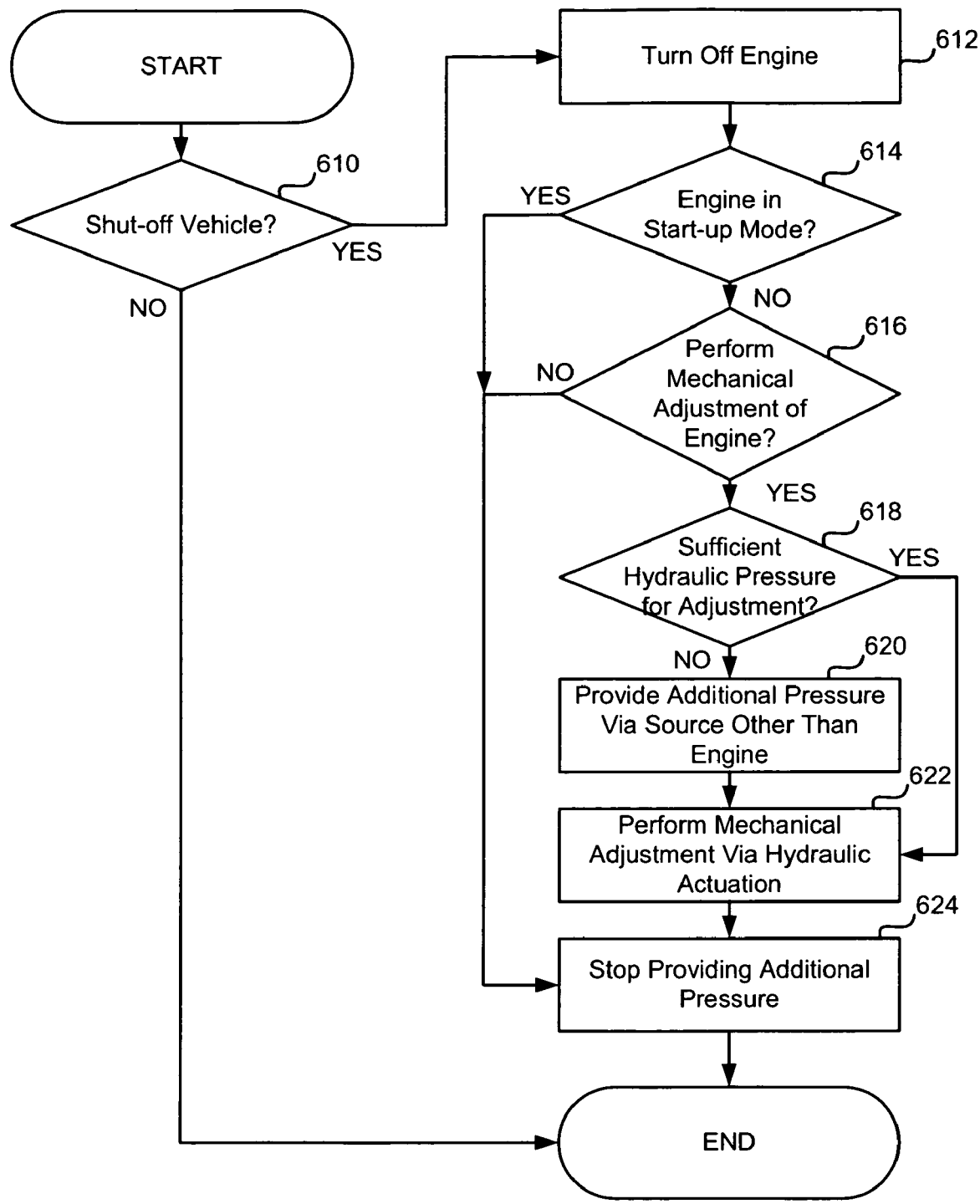

While FIG. 5 provides an example control operation for engine shut-off, FIG. 6 provides an example control operation for vehicle shut-off (i.e. where the engine, energy conversion device, and other systems are shut-off). At 610 it is judged whether to shut-off the vehicle. If the answer is no, the routine ends. Alternatively, if the answer is yes, the engine is turned off (612) in addition to other vehicle systems. In some conditions, various adjustments and/or control operations may be performed before the engine and/or other vehicle systems are shut-off. Next, at 614, it is judged whether the engine is in a start-up mode. In some examples, the start-up mode may be a mode where the engine is configured for a cold start (i.e. the engine is at or near ambient conditions).

If the answer at 614 is yes, first oil pump 22 is shut-off (624) along with the remaining vehicle systems. Alternatively, if the answer at 614 is no, it is judged at 616 whether a mechanical adjustment of the engine that relies on hydraulic actuation of one or more engine components is desired. If the answer at 616 is no, the routine proceeds to 624. Alternatively, if the answer at 616 is yes, it is judged at 618 whether there is sufficient oil pressure to perform the hydraulically actuated adjustment. If the answer is no, first oil pump 22 is operated to provide sufficient oil pressure even though the engine is off. Next, at 622 the mechanical adjustment is performed and first oil pump 22 is shut-off (624). Finally, the routine ends.

The method described in FIG. 6 may be used, for example, when the driver shuts-off the vehicle, thereby enabling preparation for a subsequent start-up of the vehicle. Furthermore, in some embodiments, the methods provided by 614-624 may be utilized at start-up instead of or in addition to vehicle shut-off. For example, if an engine adjustment is made in anticipation of a cold start condition, but the vehicle is instead started when the engine is warm (i.e. above ambient conditions), an additional adjustment(s) may be performed prior to start-up to account for the current operating conditions of the vehicle.

Figure 7:
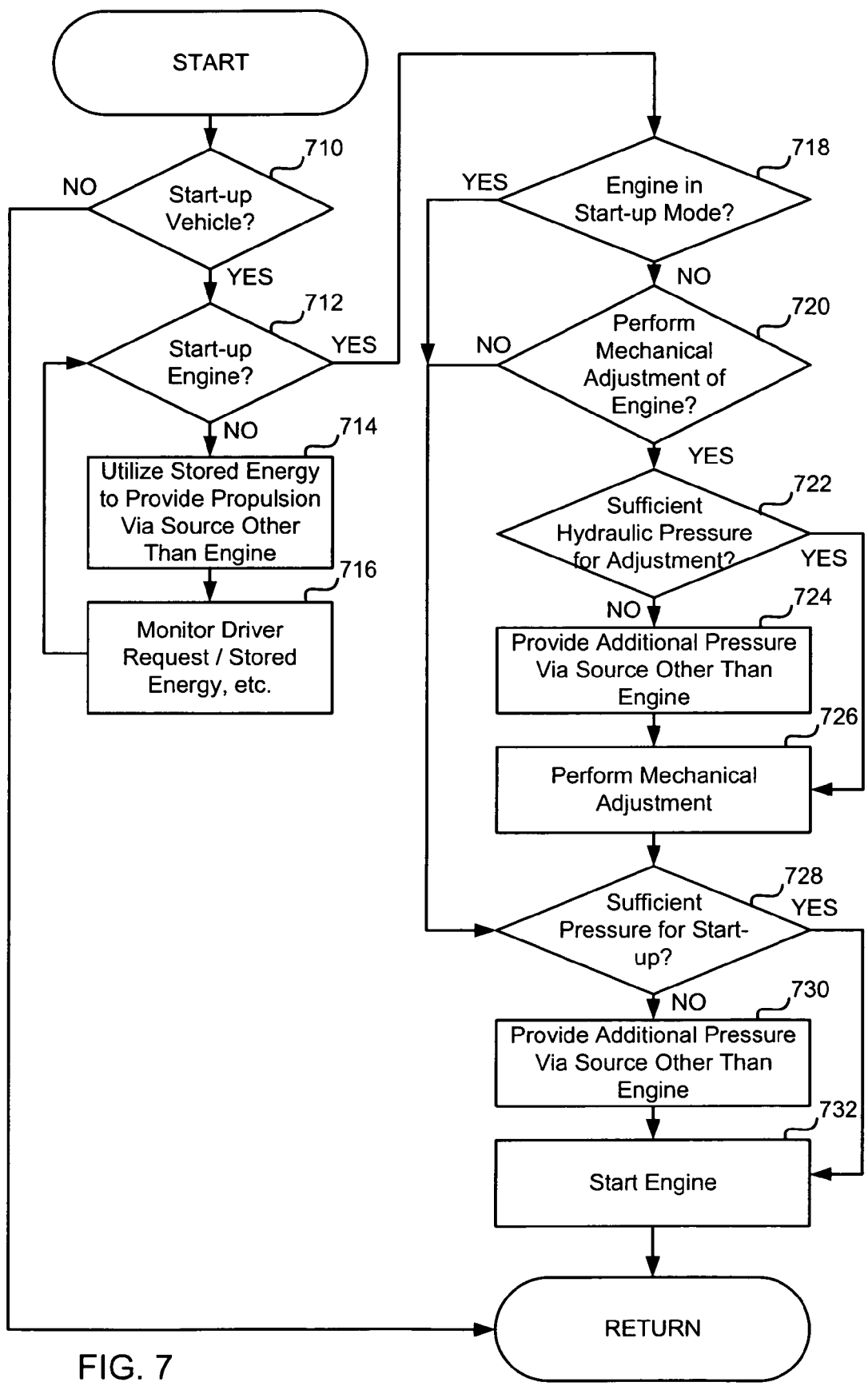

An example vehicle start-up operation is described herein with reference to FIG. 7. At 710 it is judged whether to start-up the vehicle. If the answer at 710 is no, the routine ends. Alternatively, if the answer at 710 is yes, it is judged at 712 whether to start-up the engine. If the answer is no, the energy conversion device may be used to provide the driver requested vehicle propulsion (714) and the operating conditions of the vehicle are monitored, including the requested torque and the amount of energy stored by the energy storage device, among others. Next, the routine returns to 712.

Alternatively, if it is judged at 712 to start-up the engine, the routine proceeds to 718. At 718 it is judged whether the engine is in the start-up mode based on the current or predicted operating conditions of the vehicle (e.g. ambient conditions, etc.). If the answer is yes, the routine proceeds to 728. Alternatively, if the answer at 718 is no, the routine proceeds to 720. At 720 it is judged whether to perform a mechanical adjustment that utilizes hydraulic actuation. If the answer is no, the routine proceeds to 728. Alternatively, if the answer at 720 is yes, the routine proceeds to 722 where it is judged whether there is sufficient oil pressure for the desired adjustment. If the answer is no, first oil pump 22 is operated to provide sufficient oil pressure (724). Alternatively, if the answer is yes, the desired adjustment is performed (726).

Next, at 728 it is judged whether there is sufficient oil pressure for engine start-up. For example, if the vehicle includes an engine driven oil pump, then oil pressure may be delivered to the engine as the engine begins to rotate. However, in some conditions, it may be desirable to provide higher oil pressure to the engine before and/or during engine crank, thereby reducing engine wear at start-up, under some conditions. Thus, if the answer at 728 is no, first oil pump 22 is operated by energy supplied from at least one of the energy storage and the energy conversion device to provide additional oil pressure for engine start-up. Next, at 732 the engine is started. In this manner, an oil pump that is at least partially independent of engine speed can be used to provide oil pressure to the engine before the engine is started and/or begins cranking.

It should be appreciated that the example control routines described herein are dependant upon the configuration of the hybrid propulsion system. In particular, the configuration and size of first oil pump 22 (e.g. whether it is electrically driven or both engine driven and electrically driven) and whether a second engine driven oil pump 23 is included may vary how the various control routines are carried out by controller 12. Note that the example control and estimation routines included herein can be used with various engine and/or hybrid propulsion system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 8:
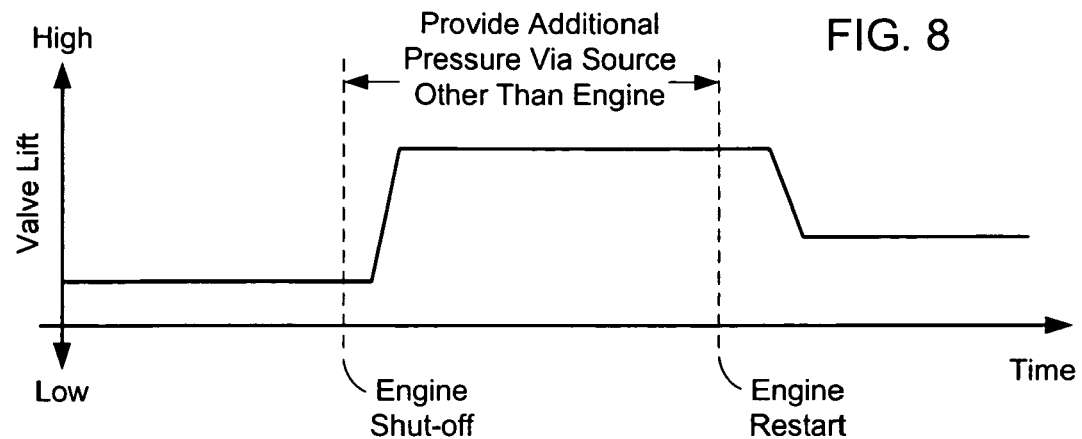
FIGS. 8-10 show example applications of the control strategies described herein.
Figure 9:
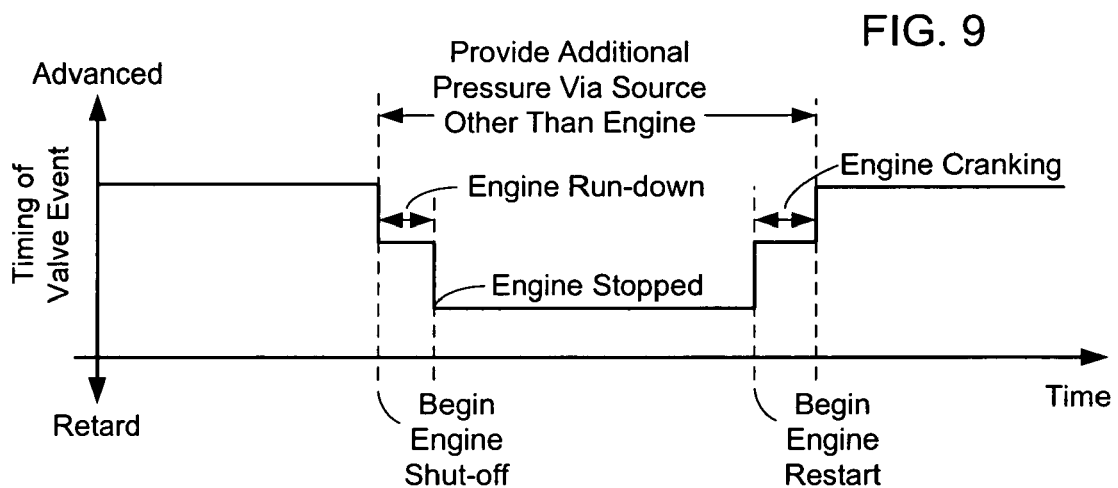
Figure 10:
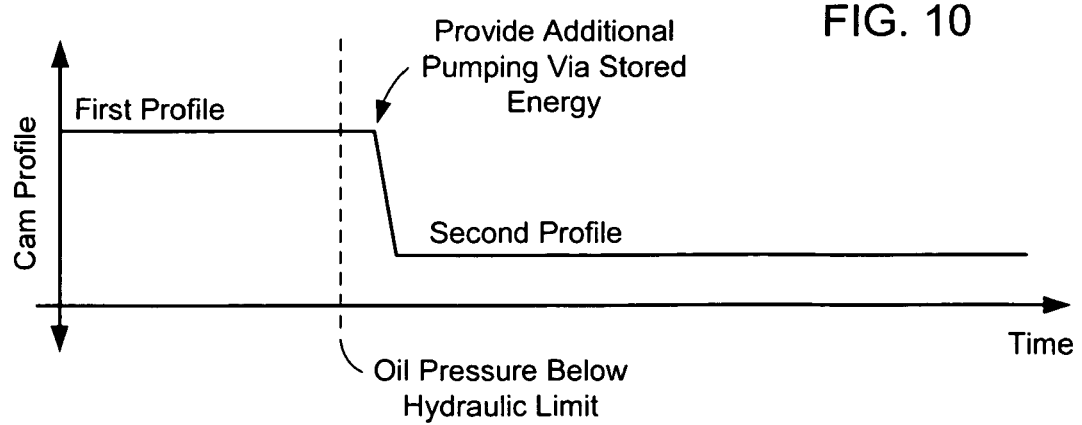

FIGS. 8-10 show example applications of the control strategies described above. In particular, FIG. 8 shows how valve lift (vertical axis) may be adjusted via hydraulic actuation in response to vehicle operation (horizontal axis). FIG. 8 illustrates an engine operating with at least a valve having a first valve lift, shown as a substantially horizontal solid line. At some later time, the engine is shut-off as described above with reference to FIG. 5 and/or FIG. 6. After the engine is shut-off, the valve lift may be adjusted by operating first oil pump 22 via stored energy to provide sufficient oil pressure for hydraulic actuation of a variable valve lift (VVL) system. During the time the engine is shut-off, first oil pump 22 may be powered by a source other than the engine, such as energy supplied from the energy storage device. As shown in FIG. 8, the valve lift may be adjusted to a higher lift before the engine is restarted with the higher valve lift condition. After the engine is restarted, the valve lift is shown to be again adjusted by oil pressure supplied by an engine driven oil pump and/or via pressure supplied via the energy storage device.

Similarly, FIG. 9 shows how the valve timing of at least one valve may be adjusted during an engine shut-off period via pressure supplied by a source other than the engine. For example, the engine is shown initially operating at a first (intake and/or exhaust) valve timing condition. Next, the engine is shut-off, wherein the valve timing is adjusted to attain a second valve timing condition during an engine rundown period via hydraulic actuation of a cam profile switching (CPS) or a variable valve timing (VVT) system. Next, as the engine stops rotating, the valve timing condition may be again adjusted, for example, to a timing condition suitable for restart. Alternatively, the valve timing of one or more valves may be adjusted to avoid valve overlap between an intake and exhaust valve at the stopped position, thereby reducing airflow through the cylinder. In some conditions, this operation may be performed to reduce airflow to the catalyst or NOx trap during engine shut-off.

Continuing with FIG. 9, after the engine rotation is stopped for a period of time, the engine may be restarted. After restart is initiated, the timing of one or more valves may be adjusted via hydraulic actuation during engine cranking. Again, this hydraulic actuation may be facilitated by oil pressure supplied from a source other than the engine, from the engine, or combinations thereof. Finally, the valve timing may be again adjusted via hydraulic actuation after cranking has occurred. Thus, as shown in FIG. 9, valve timing may be adjusted even at low engine speeds and/or when the engine is shut-off by supplying energy to first oil pump 22 from a source other than the engine. It should be appreciated that the engine may be started with a hydraulic actuator in a first position repeatedly under some conditions and in a second position repeatedly under other conditions.

FIG. 10 shows an example of how cam profiles may be switched during vehicle operation even when insufficient oil pressure is provided by an engine driven oil pump. For example, the engine may operate with at least a valve following a first cam profile. At a later time, the oil pressure provided by an engine driven oil pump (if one is included) may be less than sufficient to provide cam profile switching. Thus, additional pumping may be provided via stored energy (e.g. by operating first oil pump 22), thereby enabling a cam profile switching operation, wherein the engine is shown operating with the second cam profile.

In this manner, the hybrid propulsion system may include an oil pump (i.e. first oil pump 22) that is configured to be operated at least partially independent of engine operation and/or engine speed. This oil pump may provide hydraulic pressure to perform a variety of adjustments to the engine by receiving energy from at least one of the energy conversion device and energy storage device. Thus, the engine may transition between combustion modes (e.g. HCCI, SI, CI, etc.), cylinder deactivation modes (i.e. number of cylinders carrying out combustion), and other engine operating conditions (e.g. valve lift, valve timing, cam profile selection, cam timing, etc.) even when the engine is operating at low engine speeds, is shut-off, or the engine oil is at elevated temperatures. The oil pump may also be configured to supply additional oil pressure to the engine before and during engine start-up, thereby reducing engine wear, under some conditions. Furthermore, this oil pump may enable the reduction of size or elimination of an engine driven oil pump, which may reduce the amount of energy needed to crank and/or start-up the engine, thereby further improving vehicle efficiency. In another example, oil pressure may be supplied to the engine via an oil pump powered by a source other than the engine so that the engine is stopped in a position advantageous to restart.

As described above, hydraulic actuation of one or more engine systems, such as a valve adjustment device, via oil pressure supplied at least partially by a source other than the engine is provided. At least one advantage of this system is that valve operation may be adjusted when the engine is shut-off or at low engine speeds. Furthermore, it should be appreciated that the advantages described herein may be achieved with hybrid propulsion systems of various configurations. Some of these hybrid propulsion systems may utilize operating strategies that include engine shut-off and/or cylinder deactivation wherein vehicle propulsion is provided by a source other than the engine, such as by an electric motor. An engine configured in this type of hybrid propulsion system may be shut-off, restarted, and/or deactivated more often than with engine only propulsion system configurations. This increase in the frequency of engine shut-off, restart and/or deactivation may further increase the conditions where an engine driven oil pump may not provide sufficient hydraulic pressure to achieve a desired valve adjustment. As such, at least another advantage of the system described herein may enable greater engine efficiency and control, while reducing noise and vibration harshness (NVH) and/or engine emissions by providing sufficient oil pressure to adjust valve operations during frequent engine shut-off, restart, and/or deactivation strategies.

It will be appreciated that the configurations and routines disclosed herein are exemplary in nature, and that these specific embodiments are not to be considered in a limiting sense, because numerous variations are possible. For example, the above technology can be applied to V-4, V-6, V-8, I-4, I-6, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system for an internal combustion engine of a vehicle, comprising:
   a hydraulic pump configured to be powered at least partially by a source other than the engine;
   an adjustable hydraulic engine actuator configured to be adjusted by hydraulic fluid supplied by the pump; and
   a control system configured to:
      during a first engine running operating mode with the hydraulic pump on, provide a first amount of energy to the hydraulic pump, during a second engine running operating mode with the hydraulic pump on, provide a second amount of energy to the hydraulic pump that is different than the first amount, and during each of the first engine running operating mode and the second engine running operating mode, adjust said adjustable hydraulic engine actuator.

2. The system of claim 1, wherein the system further comprises at least one of an intake valve and an exhaust valve.

3. The system of claim 2, wherein the hydraulic engine actuator is further configured to adjust at least one of the intake valve and the exhaust valve when adjusted by hydraulic fluid of the pump.

4. The system of claim 2, where the hydraulic engine actuator is configured to deactivate at least one of the intake valve and the exhaust valve.

5. The system of claim 2, wherein the hydraulic engine actuator is configured to vary lift of at least one of the intake and exhaust valve.

6. The system of claim 2, wherein the hydraulic engine actuator is configured to vary a timing event of at least one of the intake and exhaust valve.

7. The system of claim 1, where the system further comprises a cam, and the hydraulic engine actuator is configured to vary cam timing.

8. The system of claim 1, wherein the system further comprises at least a first cam and a second cam, and the hydraulic engine actuator is configured to switch between the first cam and the second cam.

9. The system of claim 1, wherein the hydraulic pump is an oil pump and the hydraulic fluid is engine oil.

10. The system of claim 9, wherein the oil pump is an electric oil pump.

11. The system of claim 9, wherein the oil pump is partially powered by electricity and is partially powered by the engine.

12. The system of claim 9, wherein the oil pump is configured to vary an oil pressure supplied to the engine in response to a temperature of the engine.

13. The system of claim 9, wherein the oil pump is configured to vary an oil pressure supplied to the engine in response to a rotational speed of the engine.

14. The system of claim 1, where the first engine running operating mode includes HCCI combustion and the second engine running operating mode includes SI combustion.

15. The system of claim 1, where the first engine running operating mode includes operating with a first number of deactivated cylinders and the second engine running operating mode includes operating with a second number of deactivated cylinders different than the first number.

16. A system for a hybrid vehicle, comprising:
an internal combustion engine;
an energy storage device configured to store energy;
a hydraulic pump configured to be powered at least partially by the energy storage device;
an adjustable hydraulic engine actuator configured to be adjusted by hydraulic fluid supplied by the pump;
an energy conversion device configured to convert at least one of a portion of an output of the engine and motion of the vehicle to energy storable by the energy storage device; and
a control system configured to:
during a first engine running operating mode with the hydraulic pump on, provide a first amount of energy to the hydraulic pump,
during a second engine running operating mode with the hydraulic pump on, provide a second amount of energy to the hydraulic pump that is different than the first amount, and
during each of the first engine running operating mode and the second engine running operating mode, adjust said adjustable hydraulic engine actuator.

17. The system of claim 16, wherein the control system is further configured to vary a pressure of the hydraulic fluid supplied by the hydraulic pump by varying an amount of energy supplied from the energy storage device to the hydraulic pump.

18. The system of claim 17, wherein the control system is further configured to vary the amount of energy supplied from the energy storage device to the hydraulic pump with varying engine output.

19. The system of claim 17, wherein the control system is further configured to vary the amount of energy supplied from the energy storage device to the hydraulic pump with varying engine temperature.

20. The system of claim 16, wherein adjustment of the hydraulic engine actuator causes an adjustment of at least one of an intake valve and an exhaust valve of the engine.

21. A system, comprising:
an internal combustion engine having at least an adjustable valve;
a hydraulic actuator configured to adjust said adjustable valve;
a secondary power source;
an oil pump configured to be driven at least partially by the secondary power source, wherein the oil pump is configured to supply oil pressure to at least the hydraulic actuator; and
a control system configured to:
during a first engine running operating mode with the oil pump on, provide a first amount of energy to the oil pump,
during a second engine running operating mode with the oil pump on, provide a second amount of energy to the oil pump that is different than the first amount, and
during each of the first engine running operating mode and the second engine running operating mode, vary the oil pressure supplied by the oil pump to the hydraulic actuator to thereby adjust the hydraulic actuator.

22. The system of claim 21, wherein one or more of the first engine running operating mode and the second engine running operating mode includes a combustion mode of the engine.

23. The system of claim 21, further comprising adjusting the oil pressure based on one or more of a temperature of the engine, an output of the engine, an ambient air temperature and an ambient air pressure.

24. The system of claim 21, wherein one or more of the first engine running operating mode and the second engine running operating mode includes a number of combustion chambers of the engine that are deactivated.

25. A method of operating a hybrid propulsion system for a vehicle including at least an internal combustion engine, an electric oil pump configured to provide oil pressure to the engine, wherein the oil pump is configured to operate independent of engine speed, and a battery configured to provide electrical energy to the oil pump, the method comprising:

during engine running and with the electric oil pump running:

operating the engine with a first valve operation;

supplying a first amount of electrical energy to the electric oil pump from the battery;

operating the electric oil pump with the first amount of electric energy to supply a first oil pressure to the engine for the first valve operation;

supplying a second amount of electrical energy to the electric oil pump from the battery;

operating the electric oil pump with the second amount of electric energy to supply a second oil pressure to the engine for a second valve operation;

adjusting a condition of a valve of said engine with said second oil pressure, based on a change in an engine operating condition; and operating the engine with the second valve operation, wherein the second valve operation is different from the first valve operation.

26. The method of claim 25, further comprising operating the electric oil pump to supply oil pressure to the engine prior to starting the engine.

27. The method of claim 26, wherein the oil pressure supplied to the engine prior to starting the engine is varied in response to at least one of ambient air temperature and engine temperature.

* * * * *